US012611670B2

(12) United States Patent
Ruggeri et al.

(10) Patent No.: US 12,611,670 B2
(45) Date of Patent: Apr. 28, 2026

(54) NANOPARTICLE TRAPPING AND TRANSPORT TECHNIQUES

(71) Applicant: International Business Machines Corporation, Armonk, NY (US)

(72) Inventors: Francesca Ruggeri, Zurich (CH); Armin Knoll, Adliswil (CH); Christian Michael Schwemmer, Zurich (CH); Federico Paratore, Zurich (CH); Heiko Wolf, Pfaeffikon (CH); Philippe Marc Nicollier, Sion (CH)

(73) Assignee: International Business Machines Corporation, Armonk, NY (US)

( * ) Notice: Subject to any disclaimer, the term of this patent is extended or adjusted under 35 U.S.C. 154(b) by 1210 days.

(21) Appl. No.: 17/136,191

(22) Filed: Dec. 29, 2020

(65) Prior Publication Data

US 2022/0203367 A1 Jun. 30, 2022

(51) Int. Cl.
*B01L 3/00* (2006.01)

(52) U.S. Cl.
CPC ... *B01L 3/502761* (2013.01); *B01L 2200/025* (2013.01); *B01L 2200/0668* (2013.01);
(Continued)

(58) Field of Classification Search
CPC ......... B01L 3/502761; B01L 2200/025; B01L 2200/0668; B01L 2300/046;
(Continued)

(56) References Cited

U.S. PATENT DOCUMENTS 9,057,099 B2 6/2015 Erickson
9,753,009 B2 9/2017 German
(Continued)

FOREIGN PATENT DOCUMENTS

CN 101848757 A 9/2010
CN 105842435 A 8/2016
(Continued)

OTHER PUBLICATIONS

Machine Translation CN107118938A (Year: 2017).*
(Continued)

*Primary Examiner* — Elizabeth A Robinson
*Assistant Examiner* — Sophia Y Lyle
(74) *Attorney, Agent, or Firm* — Gavin Giraud

(57) ABSTRACT

Approaches presented herein enable a device for trapping nanoparticles. More specifically, the device comprises a dielectric layer, an electrically insulating lid, a plurality of trapping electrodes, and electrical circuit connectors. The dielectric layer has an exposed surface, which is structured to form a set of recesses in the dielectric layer. The recesses are dimensioned so as to allow nanoparticles (e.g. biomolecules) to be trapped. The electrically insulating lid extends above the exposed surface of the dielectric layer. A flow path is defined between the lid and the exposed surface, such that a liquid can be introduced in the flow path. The trapping electrodes are arranged opposite the lid with respect to the exposed surface to face respective ones of the recesses. This arrangement defines pairs, such that each pair associates one of the trapping electrodes with a respective one of the recesses.

12 Claims, 3 Drawing Sheets

(52) U.S. Cl.
CPC ..... *B01L 2300/046* (2013.01); *B01L 2300/12* (2013.01); *B01L 2400/0415* (2013.01)

(58) Field of Classification Search
CPC ......... B01L 2300/12; B01L 2400/0415; B01L 2300/0645; B01L 2300/0893
See application file for complete search history.

(56) References Cited

U.S. PATENT DOCUMENTS

| | | | | |
|---|---|---|---|---|
| 10,012,579 | B2 | 7/2018 | Bocchi | |
| 2009/0032401 | A1* | 2/2009 | Ronaghi | B01L 3/502761 204/647 |
| 2010/0290191 | A1* | 11/2010 | Lin | H01L 24/82 361/764 |
| 2011/0136698 | A1 | 6/2011 | Chuang | |
| 2013/0008789 | A1 | 1/2013 | Ronaghi | |
| 2017/0226453 | A1* | 8/2017 | Yang | B01L 3/502715 |
| 2017/0234799 | A1 | 8/2017 | Marks | |
| 2017/0369944 | A1* | 12/2017 | Barrall | C12Q 1/6874 |
| 2018/0272339 | A1 | 9/2018 | Fringes | |
| 2018/0272341 | A1* | 9/2018 | Fringes | B01D 61/427 |

FOREIGN PATENT DOCUMENTS

| | | | |
|---|---|---|---|
| CN | 107118938 | A | 9/2017 |
| CN | 110923111 | A | 3/2020 |
| WO | 2022/142763 | A1 | 7/2022 |

OTHER PUBLICATIONS

LabXchange (Comparing Prokaryotic and Eukaryotic Cells, 2020, WebPage Printout, 2 pages) (Year: 2020).*

"Patent Cooperation Treaty PCT Notification of Transmittal of the International Search Report and the Written Opinion of the International Searching Authority, or the Declaration", International application No. PCT/CN2021/130094, International filing date Nov. 11, 2021 (Nov. 11, 2021), Date of Mailing Feb. 15, 2022 (Feb. 15, 2022), 10 pages.

Ashkin, A., "Acceleration and Trapping of Particles by Radiation Pressure", Physical Review Letter, 24: 156-9 (Jan. 26, 1970).

Gerspach et al., "Soft Electrostatic Trapping in Nanofluidics", ResearchGate, <https://www.researchgate.net/publication/321494714>, Dec. 2017, 11 pages.

Huang et al., "Continuous Particle Separation Through Deterministic Lateral Displacement", Science Magazine, May 14, 2004, vol. 304, Issue 5673, pp. 987-990 DOI: 10.1126/science.1094567.

Kim et al., "Scanning-aperture trapping and manipulation of single charged nanoparticles", Nature Communications 5, 3380 (2014), <https://doi.org/10.1038/ncomms4380>, 6 pages.

Kiumars et al., Field effect electroosmosis, Journal of Chromatography A, vol. 559, Issues 1-2, 1991, pp. 95-101, ISSN 0021-9673, <https://doi.org/10.1016/0021-9673(91)80061-K>.

Krishnan et al., "Geometry-induced electrostatic trapping of nanometric objects in a fluid", Nature 467, 692-695 (2010), <https://doi.org/10.1038/nature09404>.

Lee et al., "Flux Reversal in a Two-state Symmetric Optical Thermal Ratchet", Physical Review E, DOI: 10.1103/physreve.71.060102, <https://arxiv.org/abs/cond-mat/0506285v1>, Jun. 13, 2005, 4 pages.

Paratore et al., "Dynamic microscale flow patterning using electrical modulation of zeta potential", PNAS May 2019, 116 (21) 10258-10263, <https://www.pnas.org/cgi/doi/10.1073/pnas.1821269116>, 6 pages.

Rousselet et al., "Directional motion of brownian particles induced by a periodic asymmetric potential", Nature 370, 446-447 (1994).

Schasfoort et al., "Field-Effect Flow Control for Microfabricated Fluidic Networks", Science Oct. 29, 1999: vol. 286, Issue 5441, pp. 942-945, DOI: 10.1126/science.286.5441.942.

Shin et al., "Membraneless water filtration using CO2", Nature Communications, May 2, 2017, <https://doi.org/10.1038/ncomms15181>, 6 pages.

Van Der Wouden et al., "Directional flow induced by synchronized longitudinal and zeta-potential controlling AC-electrical fields", Lab on a Chip, 2006, 6, doi:10.1039/b607403k, <www.rsc.org/loc>, 1300-1305.

Wang et al., "Probing Single Biomolecules in Solution Using the Anti-Brownian Electrokinetic (ABEL) Trap", Accounts of chemical research, vol. 45, No. 11, 2012, 1955-1964.

Lee et al., "Observation of Flux Reversal in a Symmetric Optical Thermal Ratchet", Physical Review Letters, Mar. 22, 2005, 4 pages, vol. 94, doi: https://doi.org/10.1103/PhysRevLett.94.110601.

Marcelo O. Magnasco, "Forced thermal ratchets", Physical Review Letters, Sep. 6, 1993, pp. 1477-1481, vol. 71, No. 10, doi: https://doi.org/10.1103/PhysRevLett.71.1477.

Marquet et al., "Rectified Motion of Colloids in Asymmetrically Structured Channels", Physical Review Letters, Apr. 8, 2002, vol. 88, No. 16, 4 pages, doi: https://doi.org/10.1103/PhysRevLett.88.168301.

Wang et al., "An Adaptive Anti-Brownian Electrokinetic Trap with Real-Time Information on Single-Molecule Diffusivity and Mobility", ACS Nano, May 25, 2011, pp. 5792-5799, vol. 5, No. 7, doi: https://doi.org/10.1021/nn2014968.

* cited by examiner

NANOPARTICLE TRAPPING AND TRANSPORT TECHNIQUES

TECHNICAL FIELD

The present invention relates generally to nanoparticle trapping and transport and, more specifically, to devices related to Brownian motor structures and electrodes for powering thereof.

BACKGROUND

Several detection methods of nanoparticles have been proposed, which notably rely on microfluidic techniques. Microfluidics deals with the precise control and manipulation of small volumes of fluids. Typically, such volumes are in the sub-milliliter range and are constrained to micrometer-length scale channels. Prominent features of microfluidics originate from the peculiar behavior that liquids exhibit at such scales. Flow of liquids in microfluidics is typically laminar. Microfluidic devices generally refer to microfabricated devices, which are used for pumping, sampling, mixing, analyzing and dosing liquids. Many microfluidic devices have user chip interfaces and closed flow paths. Closed flow paths facilitate the integration of functional elements (e.g., heaters, mixers, pumps, UV detector, valves, etc.) into one device while minimizing problems related to leaks and evaporation. The analysis of liquid samples often requires a series of steps (e.g., filtration, dissolution of reagents, heating, washing, reading of signal, etc.). Metallic electrodes are sometimes patterned inside or across microchannels of the device. Microfluidics has opened the door for applications in many areas of healthcare and life sciences, such as point-of-care diagnostics (POCDs), environmental analysis, and drug discovery.

Moreover, artificial Brownian motors have been proposed for selective particle transport using an asymmetric energy landscape and non-equilibrium fluctuations. Such Brownian motors may exploit isotropic diffusion and a periodically generated, asymmetric trapping potential to transport micron-scale particles. The required potentials are typically obtained using optical or dielectrophoretic forces, which scale with particle volume and are therefore not necessarily efficient at the nanoscale. While flashing ratchets rely on diffusion, designs of rocking ratchets have been proposed, which may generate directed particle motion based on a fluctuating external force and a static potential landscape. Moreover, rocking ratchets were proposed for nanoscale particles, which rely on strong and reliable static energy landscapes.

SUMMARY

According to a first aspect, the present invention is embodied as a nanoparticle trapping device. The device comprises: a dielectric layer, an electrically insulating lid, a plurality of trapping electrodes, and electrical circuit connectors. The dielectric layer has an exposed surface, which is structured to form a set of recesses in the dielectric layer. The recesses are dimensioned so as to allow nanoparticles to be trapped. The electrically insulating lid extends above the exposed surface of the dielectric layer. A flow path is accordingly defined between the lid and the exposed surface. In operation of the device, a liquid can be introduced in the flow path. The trapping electrodes are arranged opposite the lid with respect to the exposed surface, facing respective ones of the recesses. This arrangement defines pairs, where each pair associates one of the trapping electrodes with a respective one of the recesses. In one embodiment, the device comprises at least three trapping electrodes and at least three respective recesses. The electrical circuit connectors connect each of the trapping electrodes.

Therefore, the trapping electrodes can be biased, so as to trap or expel, and therefore move one or more nanoparticles across the recesses. Note, the electrical circuit connectors may advantageously connect each of the trapping electrodes, individually, so as for the trapping electrodes to be individually addressable and, therefore, independently biased, e.g., in a sequential manner. Still, some of the trapping electrodes may possibly be concomitantly biased. In variants, subsets of electrodes may be interconnected, so as to be able to simultaneously bias subsets of the electrode pairs. In all cases, instead of being powered by electrodes in a lateral configuration (i.e., on each outer, opposite end of the flow path), the Brownian motor structure is here powered by electrodes located underneath the recesses, e.g., forming a ratchet structure. This arrangement allows improved control in terms of tunability and/or modulation of the trapping potential landscape and the trapping strength with respect to known nanoparticle trapping devices (e.g., based on usual topographic ratchets powered by lateral electrodes).

In embodiments, the device further comprises one or more counter electrodes, each arranged so as to be exposed in the flow path and thereby come into contact with a liquid introduced in the flow path, in operation of the device. In addition, the electrical circuit connectors comprise further connectors that individually connect the one or more counter electrodes. In one embodiment, the device comprises a pair of counter electrodes, including the at least one counter electrode, wherein the counter electrodes are arranged on opposite sides of the plurality of trapping electrodes. In variants, the counter electrodes may form part of an external device meant to be paired with the trapping device.

In embodiments, the device further includes an insulating substrate arranged opposite the lid with respect to the dielectric layer. The dielectric layer covers the substrate. At least a subset of the electrical circuit connectors extends to a surface of the substrate that is covered by the dielectric layer. In addition, each of the trapping electrodes is at an interface between the dielectric layer and the insulating substrate. The interface is defined as the contact surface between a lower surface of the dielectric layer and the covered surface of the substrate.

In one embodiment, each of the trapping electrodes protrudes from the covered surface of the substrate and is at least partly integrated in the dielectric layer.

In embodiments, both the recesses and the trapping electrodes are arranged according to a bidimensional pattern in a respective plane, which is substantially parallel to an average plane of the dielectric layer. In one embodiment, the set of recesses comprises distinct subsets of recesses, while the plurality of trapping electrodes comprise distinct subsets of trapping electrodes, the latter arranged to face the distinct subsets of recesses.

In embodiments, the device has one or more of the following features: a minimal distance between the insulating lid and the exposed surface of the dielectric layer is between 10 nm and 200 nm, and in a preferred embodiment, between 50 nm and 200 nm, the minimal distance measured perpendicularly to an average plane of the dielectric layer; an average depth of the recesses is between 10 nm and 200 nm, the average depth measured perpendicularly to the average plane of the dielectric layer; an average radius of the recesses is between 100 nm and 500 nm, the average radius measured substantially parallel to the average plane of the dielectric layer; and an average thickness of the dielectric layer is between 10 nm and 10 μm, and in a preferred embodiment, between 300 nm and 700 nm, the average thickness measured perpendicularly to the average plane of the dielectric layer.

In embodiments, the dielectric layer comprises silicon oxynitride (SiON). In one embodiment, one or each of the lid and the substrate comprises or consists of glass. Other dielectric materials (in one embodiment, light-permissive) can be contemplated in variants.

According to another aspect, the invention is embodied as a nanoparticle trapping system, which may be configured as an apparatus or a device. The system comprises a nanoparticle trapping device such as described above. In addition, the system includes one or more counter electrodes, arranged on opposite sides of the plurality of trapping electrodes. The counter electrodes may for example be provided on a peripheral device paired with the trapping device. Moreover, the system comprises a control unit connected, on the one hand, to the electrical circuit connectors and, on the other hand, to additional connectors that individually connect the one or more counter electrodes. The control unit is configured to apply voltage biases to selected pairs of electrodes via the electrical circuit connectors and the additional connectors. Each of the pairs includes one of the trapping electrodes and one of the one or more counter electrodes. The control unit is normally configured to controllably apply the voltage biases, in a programmatic fashion. Several pairs of electrodes may typically be biased concomitantly, though with distinct voltage values, so as to shape the landscape potential according to a desired application.

According to a final aspect, the invention is embodied as a method of controlling nanoparticles. The method comprises providing a nanoparticle trapping system. The system includes: a dielectric layer having an exposed surface; an electrically insulating lid extending above the exposed surface, so as to define a flow path between the lid and the exposed surface; a plurality of trapping electrodes arranged opposite the lid with respect to the exposed surface; and one or more counter electrodes. The method further comprises introducing a liquid in the flow path. Note, the counter electrodes must be arranged so as to come in contact with the liquid. Then, a voltage bias is applied between a selected pair of electrodes, which includes one of the trapping electrodes and one of the counter electrodes, or voltage biases are concomitantly applied to distinct pairs of electrodes. The voltage is applied so as to trap a particle at a given location on the exposed surface, e.g., at the level of one of the trapping electrodes.

In embodiments, the method further comprises altering (e.g., switching off) the voltage bias applied to release (i.e., expel) the particle trapped.

In one embodiment, the method comprises repeatedly applying voltage biases and/or altering voltage biases applied between selected pairs of electrodes. Again, each of the selected pairs includes one of the trapping electrodes and one of the counter electrodes. This results in moving one or more nanoparticles across the exposed surface, e.g., from an area at a level of one of the trapping electrodes to another area at a level of another one of the trapping electrodes.

In embodiments, the exposed surface of the system provided is structured to form a set of recesses facing respective ones of the trapping electrodes, wherein the trapping electrodes are arranged to face the recesses, opposite the lid with respect to the exposed surface, whereby applying the voltage bias causes to trap the charged particle on the exposed surface, e.g., in one of the recesses that is facing the one of the trapping electrodes, or at another location on the exposed surface (e.g., at the level of a detection area).

In embodiments, the voltage bias is applied to trap one or more nanoparticles on the exposed surface, and the method further comprises characterizing properties of the one or more trapped particles. In one embodiment, the voltage bias is applied so as to trap two or more nanoparticles at a given location on the exposed surface. In that case, the properties characterized may include interaction dynamics, size, and/or surface potential of the trapped particles.

Devices, systems and methods embodying the present invention will now be described, by way of non-limiting examples, and in reference to the accompanying drawings.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

Figure 1:
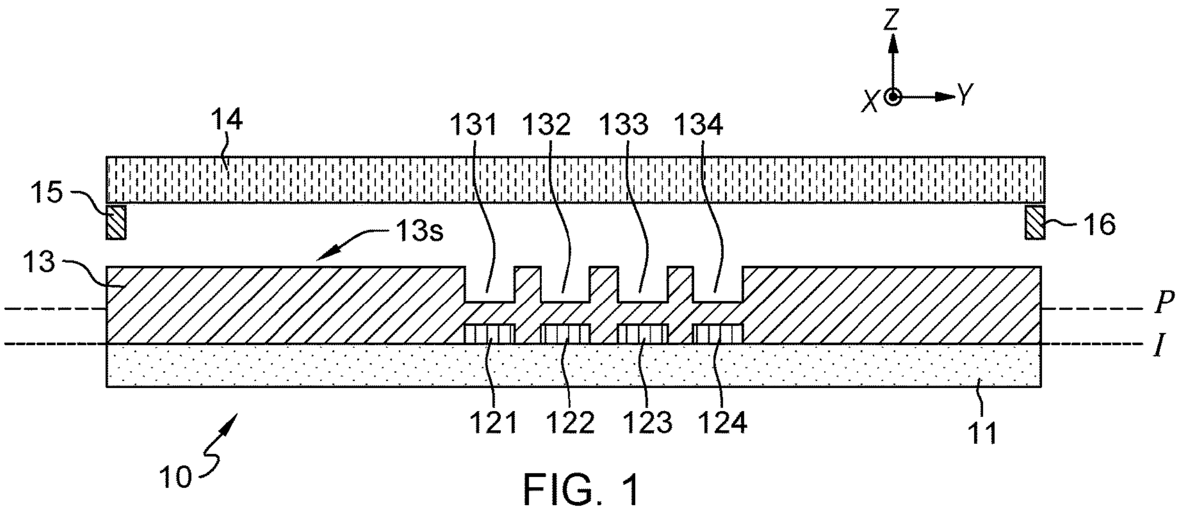
FIG. 1 is a 2D cross-sectional view of a nanoparticle trapping device according to embodiments.

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION

The control, manipulation, and/or distinction of single molecules is highly relevant to applications such as medical diagnostics. The ability to study single-molecule reactions opens remarkable scope for bio-analytics. For detection of small concentrations, the molecules must be transported to and trapped at a given area of a sensor. A device capable of moving, capturing and releasing molecules (at will) would allow continuous screening of solutions at the molecular scale, in a compact and easy-to-use platform.

Nanoparticles synthesis often yields a non-uniform distribution of size and shape of the particles. However, in many applications (e.g., gold nanoparticles for plasmonic or quantum dots), the particles should be monodispersed. To this end, a simple and cheap sorting procedure would be highly beneficial.

While typical ensemble techniques can measure average binding kinetics of biological molecules (e.g., antibodies, enzymes, etc.), the details of the underlying dynamic process are often too complex and can only be unraveled at the molecular level. To this end a platform capable of studying interactions of pairs of single molecules would open immense scope for targeted drug design.

Based on these observations, the present inventors have developed new nanoparticle trapping (and releasing) techniques, which require new architectures of trapping devices, as now described in detail.

In the following description, all references starting with "S" refer to method steps of the flowchart of FIG. 4, while numeral references pertain to physical parts or components of the device and the system shown in FIGS. 1-3.

Figure 2:
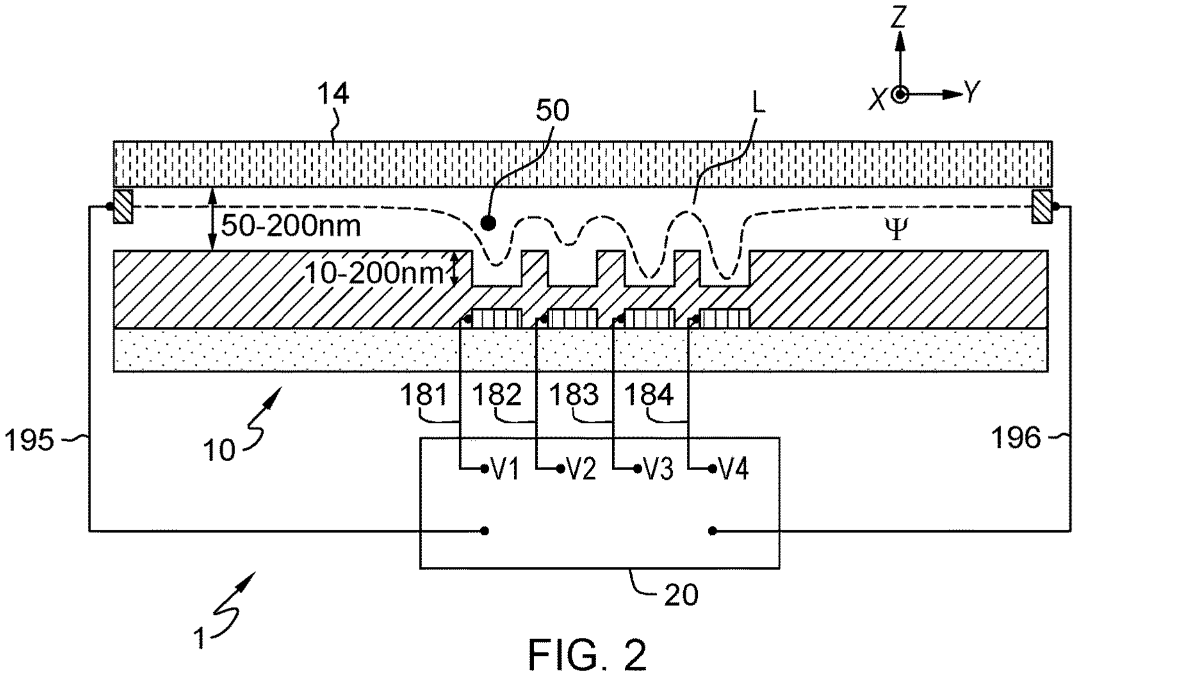
FIG. 2 shows a nanoparticle trapping system, which includes the device of FIG. 1, as well as a control unit connected to electrodes of the device, according to embodiments.
Figure 3:
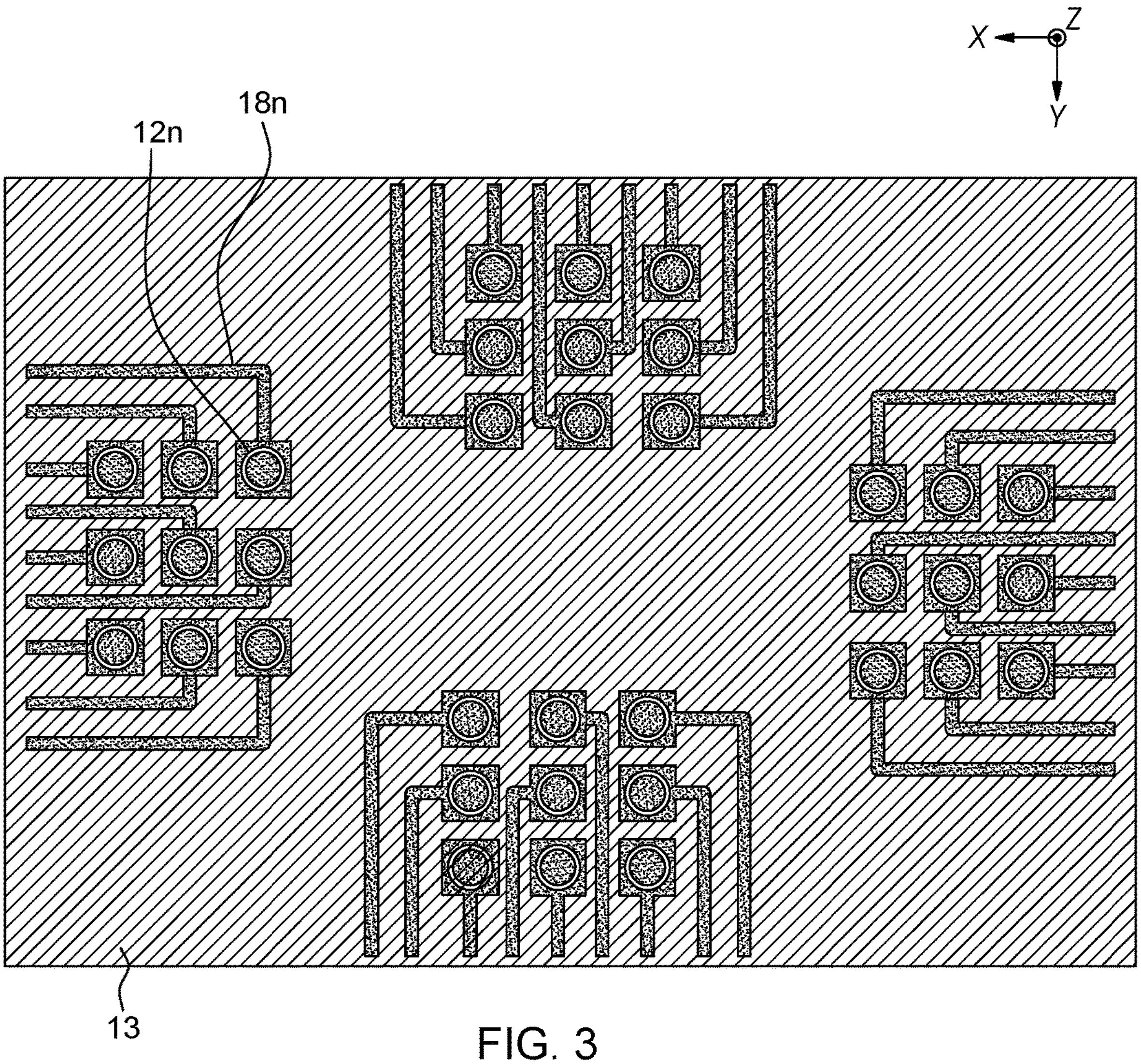
FIG. 3 is a top view of the substrate of the device of FIG. 1, showing electrodes arranged on the top surface of the substrate, i.e., the surface that is covered by the dielectric layer of the device, as in embodiments.

In reference to FIGS. 1-3, a first aspect of the invention is now described, which concerns a nanoparticle trapping device 10. The device essentially comprises a dielectric layer 13, an electrically insulating lid 14, a plurality of trapping electrodes 121-124, 12*n*, and electrical circuit connectors 181-184. In addition, it may possibly include one or more counter electrodes 15, 16, which are integrated in the device 10, as assumed in FIGS. 1 and 2.

The dielectric layer 13 exhibits a surface 13*s*, which is meant to be exposed to a liquid L introduced in the device, in operation. The exposed surface 13*s* of the dielectric layer is structured to form a set of recesses 131-134, i.e., pits or depressions, which are open on top, in the cavity formed between the lid and the surface 13*s*. The recesses have a certain depth, which extends in the dielectric layer 13. Each recess is dimensioned so as to allow nanoparticles 50 to be trapped therein. It should be noted that nanoparticles as contemplated herein may include biomolecules. The recesses may possibly form a ratchet topography, for reasons that will become apparent later. However, the recesses do not necessarily have same dimensions.

The electrically insulating lid 14 extends above the exposed surface 13*s* of the dielectric layer. Together with the dielectric layer, the lid defines a flow path for the liquid L to flow or stagnate between the lid and the exposed surface 13*s* of the dielectric layer, in operation of the device 10. In one embodiment, the lid 14 is permissive to light, e.g., transparent, to ease characterization and determination of the trapped particles.

The trapping electrodes 121-124, 12*n* are arranged opposite the lid 14, with respect to the exposed surface 13*s* of the dielectric layer. More precisely, the trapping electrodes 121-124, 12*n* are arranged to face respective recesses 131-134, thereby defining pairs, wherein each of the pairs associates a trapping electrode with a respective recess, thereby defining an electrostatic trap.

The electrical circuit connectors 181-184, 18*n* connect each of the trapping electrodes 121-124, 12*n*. This way, the trapping electrodes 121-124, 12*n* can be biased, e.g., in a sequential manner, so as to trap a nanoparticle (or release a particle trapped) at the level of a selected electrode. This, in turn, allows to move particles along the recesses and bring them to a desired location on the exposed surface, e.g., for characterization purposes.

It should be noted that the trapping electrodes may possibly be individually connected (i.e., by independent electrical circuits); the trapping electrodes are individually addressable (thanks to individual connections thereto). Therefore, electrode pairs can be independently biased. This, however, does not prevent some of the trapping electrodes to be concomitantly biased (e.g., with distinct voltage values, though). That is, in embodiments, a subset (at least) of the trapping electrodes may possibly be concomitantly biased, in order to suitably shape the landscape potential and thereby "guide" the nanoparticles to a desired trapping location. In variants, subsets of electrodes can be interconnected, so as to simultaneously bias subsets of the electrode pairs, while maintaining constant shifts between the electrodes, as discussed later in detail.

It should be noted that the recesses 131-134, the electrodes, and the flow path define a Brownian motor structure, whereby voltage biases can be applied to the electrodes to trap, release, and move the nanoparticles. Thus, the device 10 can be regarded as a nanoparticle trapping and transport device.

The Brownian motor structure may notably be designed so as to be able to laterally load particles 50 in the recesses (the electrostatic traps), i.e., by moving particles along the Brownian motor structure, in operation of the device 10. However, instead of being powered by electrodes in a lateral configuration, here the Brownian motor structure is powered thanks to electrodes located underneath the recesses.

This arrangement allows improved control in terms of tunability and/or modulation of the trapping potential landscape and the trapping strength with respect to known nanoparticle trapping devices (e.g., involving usual topographic ratchets powered by lateral electrodes, where the geometry of the landscape is fixed).

All this is now described in detail, in reference to particular embodiments of the invention. To start with, the device 10 comprises one or more counter electrodes 15, 16, e.g. integrated in the device 10. Accordingly, the electrical circuit connectors may comprise further connectors 195, 196 that individually connect the counter electrodes 15, 16, as assumed in FIG. 1.

Each counter electrode is arranged so as to be exposed in the flow path. I.e., each counter electrode comes into contact with the liquid L, once introduced in the flow path, in operation of the device 10. In one embodiment, the device 10 comprises a pair of counter electrodes 15, 16, as further assumed in FIG. 1. The counter electrodes 15, 16 are arranged on opposite sides of the plurality of trapping electrodes 121-124, 12*n*, e.g., at opposite ends of the flow path (see FIG. 1). In other words, the counter electrodes are located in a peripheral region of the flow path, outside the region in which the trapping electrodes are arranged. Additional counter electrodes may possibly be provided, e.g., circularly arranged at the periphery of the recesses (in projection).

In one embodiment, the counter electrodes 15, 16 are integrated in the device 10, as assumed in FIGS. 1 and 2. In variants, they may be provided in a peripheral device (not shown), for example in which the device 10 is meant to be encased (e.g., snap-fit). This peripheral device may notably include a control unit 20, as discussed later in reference to another aspect of the invention. In embodiments, the counter electrodes 15, 16 will be arranged so as to directly contact the liquid L, to ground the latter. The counter electrodes are normally set to 0V, in operation, while the trapping electrodes are set to non-zero voltage values that typically are between −500V and +500V.

Accordingly, the device 10 allows voltage biases to be applied between selected pairs of electrodes, where each pair includes, on the one hand, a trapping electrode and, on the other hand, a counter electrode, so as to trap a particle at a given location on the exposed surface 13*s*, e.g., at the level of a selected pair (corresponding to a local minimum of the landscape potential). It should be noted that in the present context, particles are moved thanks to a cascading effect, in which, e.g., one particle move from one potential minimum, corresponding to a selected pair of electrodes, to a neighboring potential minimum, rather than due to an electroosmotic flow. In particular, particle motion can be sequentially activated. That is, particle motion is obtained by repeatedly applying or altering voltages across the electrode pairs, as discussed later in detail, in reference to methods according to another aspect of the invention.

As further seen in FIG. 1, the device 10 may further include an insulating substrate 11. The substrate 11 is arranged opposite the lid 14 with respect to the dielectric layer 13. The dielectric layer 13 covers the substrate 11. And as better seen in FIG. 3, a subset of the electrical circuit connectors 181-184, 18*n* extend on the surface of the substrate 11 that is covered by the dielectric layer 13. Thus, in that case, each of the trapping electrodes 121-124, 12*n* is at an interface/between the dielectric layer 13 and the insulating substrate 11. The trapping electrodes 121-124, 12*n* are at least partly integrated in the substrate 11 and/or the dielectric layer 13. The trapping electrodes may for instance be contacted by electrical traces patterned or printed on the insulating substrate 11.

In one embodiment, each of the trapping electrodes 121-124, 12*n* protrudes from the covered surface of the substrate 11 and is accordingly, partly or fully integrated in the dielectric layer 13, as further assumed in FIG. 1. However, the trapping electrodes and the corresponding connectors remain well-separated from the liquid L, in operation. Thus, the proposed configuration ensures a compact device, which prevents electrical shorts.

Various configurations of recesses and electrodes can be contemplated. In one embodiment, the device 10 comprises at least three trapping electrodes 121-124, 12*n* and at least three respective recesses 131-134. In embodiments, both the recesses 131-134 and the trapping electrodes 121-124, 12*n* are arranged according to a bidimensional pattern, in a respective plane close to the interface I, i.e., a plane parallel to the average plane P of the dielectric layer 13, i.e., parallel to (x, y), see also FIG. 3.

As depicted in FIG. 3, the set of recesses 131-134 may comprise several, distinct subsets of recesses. The plurality of trapping electrodes 121-124, 12*n* may accordingly comprise several, respective subsets of trapping electrodes, in vis-à-vis. Inside a given subset, the trapping electrodes may be arranged according to a bidimensional pattern and the subsets may themselves be arranged according to a bidimensional pattern. The latter can be designed so as to adequately map the covered surface of the substrate 11, while still allowing electrical connectors (e.g., traces) to be printed on the covered surface, without crossing each other. Detection and characterization are normally carried out by trapping particles in the recesses, that is, in areas that are patterned and biased.

In embodiments, the minimal distance between the insulating lid 14 and the exposed surface 13*s* of the dielectric layer 13 is between 50 nm and 200 nm, e.g., between 80 nm and 150 nm. This minimal distance is measured perpendicularly to the average plane P of the dielectric layer 13, i.e., along axis z. It should be noted that in the accompanying drawings, the minimal distance is defined by the distance between the lid 14 and the upper, bounding plane of the exposed surface 13*s* of the dielectric layer, i.e., the plane bounding the exposed surface 13*s* from above in FIGS. 1 and 2.

In embodiments, the average depth of the recesses 131-134 is between 10 nm and 200 nm, e.g., between 50 and 120 nm. The average depth is measured perpendicularly to the average plane P of the dielectric layer 13, i.e., along axis z. In a preferred embodiment, the average radius of the recesses 131-134 is between 100 nm and 500 nm. This average radius is measured substantially parallel to the average plane P. Such dimensions allow adequate electrostatic traps to be achieved, in practice.

In a preferred embodiment, the dielectric layer 13 comprises silicon oxynitride (SiON). A SiON film can for instance be deposited on the patterned substrate 11 (i.e., after having patterned the electrodes 12*n* and the connectors 18*n*) using a plasma-enhanced chemical vapor deposition technique. Using SiON ensures low leakage currents. In variants, one or more dielectric materials selected from: titanium, $Ta_2O_5$, SiON, silica, alumina, silicon nitride, hafnium oxide, poly(p-xylylene), and poly-dimethylsiloxane (PDMS), or combinations thereof, can be contemplated. In particular, a pattern as initially obtained (e.g., by thermally patterning polyphthalaldehyde, or PPA) may be transferred to another material, e.g., using dry etching. In general, suitable materials are materials such as oxides, which spontaneously charge in contact with water or other polar liquids L, and exhibit high dielectric constants in a preferred embodiment. Examples of suitable materials include silicon oxide and aluminum oxide, which negatively and positively charge, respectively, under intermediate pH conditions. The average thickness of the dielectric layer 13 will typically be of approximately 500 nm, though it may possibly range from 10 nm to 10 μm. This average thickness is measured perpendicularly to the average plane P of the dielectric layer 13.

One or each of the lid 14 and the substrate 11 may for instance comprises glass, or another dielectric, light-permissive material, suitable for optical characterization experiments. The lid should have a sufficient thickness to ensure its mechanical stability. The substrate 11 should be sufficiently thick too, to ensure mechanical stability of the entire device 10.

Referring to FIGS. 2 and 3, another aspect of the invention is now described, which concerns a nanoparticle trapping system 1. System 1 shown in FIG. 2 comprises a device 10 such as described above, as well as one or more counter electrodes 15, 16, which are integrated in the device 10. As said, the counter electrodes are arranged on opposite sides of the plurality of trapping electrodes 121-124, 12*n*, in projection. I.e., when projected in the average plane of the device 10, the counter electrodes are located at the periphery of the trapping electrodes. The system further includes a control unit 20, which is connected to the electrical circuit connectors 181-184, 18*n*, as well as to additional connectors 195, 196, so as to be able to bias each of the trapping electrodes with respect to any of the counter electrodes. I.e., the control unit 20 is configured to apply voltage biases to selected pairs of electrodes via the electrical circuit connectors 181-184, 18*n* and the additional connectors 195, 196. As explained earlier, each pair includes one of the trapping electrodes 121-124, 12*n* and one of the counter electrodes 15, 16. The control unit will typically allow voltage biases to be controllably applied, e.g., in a programmatic fashion.

Additional aspects of the device 10 and the system 1 are described below in reference to FIG. 4, which shows a flow of high-level steps of a method of controlling nanoparticles. Such a method concerns a further aspect of the invention. It should be noted that this method and its variants are collectively referred to as "the present methods" below.

Such methods rely S10 on a nanoparticle trapping system 1. The latter comprises: a dielectric layer 13 having an exposed surface 13*s*; an electrically insulating lid 14 extending above the exposed surface 13*s*, so as to define a flow path; and a plurality of trapping electrodes 121-124, 12*n*, where the trapping electrodes are arranged opposite the lid 14 with respect to the exposed surface 13*s* of the dielectric layer. The exposed surface 13*s* of the dielectric layer of system 1 is preferably structured to form recesses 131-134 that face respective trapping electrodes 121-124, 12*n*, as explained earlier. In addition, system 1 includes one or more counter electrodes 15, 16, arranged so as to come in contact with a liquid introduced in the flow path, in operation.

The present methods require introducing S20 a liquid L in the flow path. The liquid L is typically a polar liquid. Next, a voltage bias is applied S40 between one or more selected S30 pairs of electrodes (i.e., each including one of the trapping electrodes 121-124, 12*n* and one of the counter electrodes 15, 16), so as to trap a particle at a desired location on the surface 13*s*, e.g., at the level of the trapping electrode of one of the selected pairs. The voltage bias applied locally modifies the so-called Zeta potential and, in turn, the midplane electrostatic potential $\psi$, see FIG. 2. In the example of FIG. 2, the applied voltage biases give rise to four local minima of the midplane electrostatic potential because four voltage biases are simultaneously applied. It should be noted that the applied voltages have distinct magnitude, hence the different minima observed in this example.

The method may further comprise altering S40 one or more of the voltage bias applied to release (i.e., expel) a trapped particle. E.g., one may simply switch off one or more of the previously applied biases or reduce them (in absolute value), so as for the applied biases to become less negative (or even positive). In general, the voltage values applied at the trapping electrodes may range from −+200V to −200V, up to +500 to −500V.

Figure 4:
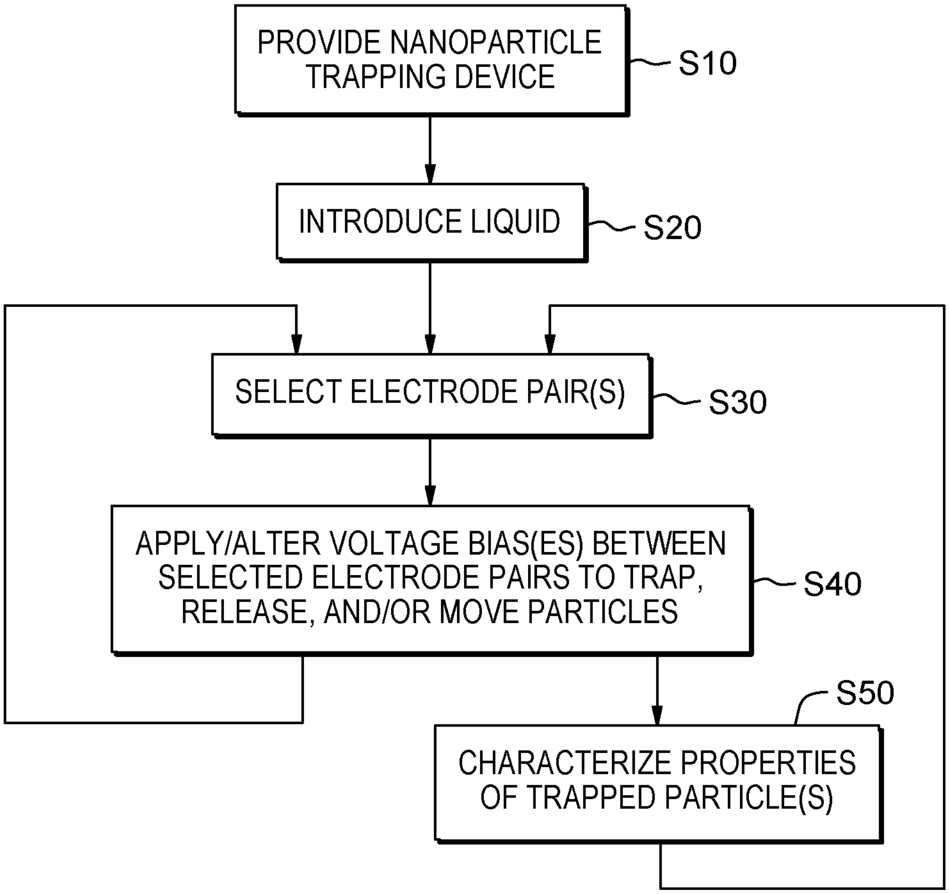
FIG. 4 is a flowchart illustrating high-level steps of a method of operating a device or a system according to embodiments, to trap, release, and/or move particles, and characterize properties of trapped particles, as in embodiments.

The foregoing steps (i.e., applying and/or altering the voltage biases) are typically repeatedly performed S40, as suggested in FIG. 4, so as to move nanoparticles 50 across the exposed surface 13*s* of the dielectric layer (and in particular across the recesses thereof). E.g., by repeatedly switching on and off biases to selected electrode pairs in an appropriate way, directed particle transport can be achieved (ratchet effect). The idea is to successively select pairs and apply/alter the voltage biases to trap and expel particles, so as to move the particles toward a desired location. The particles may for instance be brought to a detection location (a given recess or a central area of the surface 13*s*), in view of characterizing properties thereof.

For example, embodiments may involve a linear array of N traps (with N trapping electrodes underneath), in which shifted subsets of electrodes are interconnected, so as to simultaneously bias the subsets, in a sequential manner. I.e., the trapping electrode j is interconnected with each of electrodes j+n, j+2 n, etc., whereby electrodes j, j+n, j+2 n, etc. are all connected to a same circuit portion, whereby only n distinct bias voltages are needed. For example, the $1^{st}$, the $4^{th}$, and the $7^{th}$ electrode of the array may be connected to a first circuit portion, and then the $2^{nd}$, the $5^{th}$, and the $8^{th}$ electrodes are similarly connected to a second circuit portion, and so on. Thus, three distinct bias voltages are needed in this example. Accordingly, a single voltage bias may be ON at any time, which is sequentially switched in a forward sequence from one subset to the other (e.g., 1→2→3→1), to induce motion in the forward direction defined by the electrode subsets. On the contrary, switching in the reverse direction (1→3→2→1) will induce a motion in the reverse direction.

The electrodes could be arranged in circles, enabling transport to and from the center electrode. In particular, suitable voltage biases may be applied to trap one or more nanoparticles, e.g., at a given detection location, or at the level of one of the trapping electrodes 121-124, 12*n*, i.e., at one of the corresponding recesses. Next, properties of the trapped particle(s) can be characterized S50, e.g., optically, by taking advantage of the transparent layers 11, 14.

In one embodiment, voltage biases may be applied so as to trap two or more nanoparticles and then characterize S50 interaction dynamics of the trapped particles. Examples of nanoparticles that can accordingly be studied include biomolecules, colloids, or metallic particles such as gold particles. Of prominent advantage is the possibility to investigate reaction kinetics of biomolecular pairs, e.g., complementary RNA/DNA.

An example of characterization method follows, where the system is characterized using optical imaging. In particular, relying on the tracking of the nanoparticle position within the electrostatic trap, one may infer the magnitude of the electrostatic potential and hence the surface potential, and/or the size of a colloid of interest. Furthermore, by controlling the local fluorescence emission of biomolecular pairs, e.g., using Forster Resonance Energy Transfer (FRET) microscopy, one may extrapolate the binding timescales and unveil reaction kinetics.

The above embodiments have been succinctly described in reference to the accompanying drawings and may accommodate a number of variants. Several combinations of the above features may be contemplated. For example, system 1 may be designed to solely move molecules, without transporting the fluid matrix. I.e., the inserted liquid L remains essentially static, while the midplane potential is locally shaped to trap molecules at a desired location on the surface 13*s*. Meanwhile, the electrode arrangement and actuation can be designed to trap and release single molecules in the detection area of the device 10. The trapping potential can be tuned (i.e., modulated) by varying the applied biases so as to sculpt the landscape potential and tune the trapping strength. System 1 may, in variants, be designed as a microfluidic system, allowing a continuous flow of analytes.

The recesses may possibly be shaped and dimensioned so as to allow size sorting for molecules, e.g., smaller than 50 nm, allowing fine separation of the molecules. In particular, system 1 may be designed so as to allow pairs of molecules to be manipulated and their interactions to be studied at the molecular level.

In one embodiment, an array of electrodes 12*n* is patterned beneath a nanofluidic slit and a counter electrode 15, 16 on top. The dielectric layer 13 is placed between the array of electrodes and the nanofluidic slit. By applying an electric field across one electrode of the array and a counter electrode, the Zeta potential can be modified locally, which allows for trapping or expelling (charged) particles. The Zeta potential of neighboring traps can possibly be tuned in order to shape the electrostatic landscape $\psi$, capable of directing and bringing together single molecules. Directed particle transport can be achieved by repeatedly switching on and off the traps.

The system can be scaled up to sorting a mixture of many different species of particles by simply cascading devices 10 with correspondingly adapted electrodes. In combination with a specific geometry of Brownian motors (e.g., rising ratchets), the system may allow a continuous sorting of analytes. The analytes can be accordingly trapped, studied, and/or sorted by size in the electrostatic tunable landscape, and then released at will in a perpendicular flow channel. For example, desired molecular pairs can be brought together in an active area and allowed to interact after switching off the transporting landscape, in order to measure interaction dynamics (e.g., single-molecule binding kinetics).

While the present invention has been described with reference to a limited number of embodiments, variants and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, other materials than those explicitly mentioned may be contemplated by the one skilled in the art.

What is claimed is:

1. A nanoparticle trapping device, comprising:
- a dielectric layer comprising recesses in an exposed surface of the dielectric layer that are dimensioned to trap nanoparticles;
- an electrically insulating lid above the exposed surface defining a flow path between the lid and the exposed surface;
- a plurality of trapping electrodes arranged in a region under the dielectric layer, each trapping electrode aligned with and beneath a respective one of the recesses;
- a pair of counter electrodes attached to the electrically insulating lid arranged on a peripheral region of the flow path outside the region, wherein, when viewed from a z-direction orthogonal to a plane of the region, the pair of counter electrodes are located outside of the region of the trapping electrodes; and
- electrical circuit connectors connecting each of the plurality of trapping electrodes to an individually addressable voltage bias.

2. The device according to claim 1, wherein the device comprises at least three of the trapping electrodes and at least three respective ones of the recesses.

3. The device according to claim 1, wherein each counter electrode is arranged so as to be exposed in the flow path and thereby contacting a liquid introduced in the flow path, in operation of the device, and wherein the electrical circuit connectors comprise further connectors, wherein one of the further connectors connects to one of the pair of the counter electrodes, and another of the further connectors connects to the other of the pair of the counter electrodes.

4. The device according to claim 1, wherein the device further includes an insulating substrate arranged below the dielectric layer and opposite the exposed surface, wherein at least a subset of the electrical circuit connectors extend on a surface between the insulating substrate and the dielectric layer, and wherein each of the plurality of trapping electrodes is at an interface between the dielectric layer and the insulating substrate.

5. The device according to claim 4, wherein each of the plurality of trapping electrodes protrudes from the substrate and is at least partly integrated in the dielectric layer.

6. The device according to claim 4, wherein the dielectric layer comprises silicon oxynitride (SiON), and wherein one or each of the lid and the substrate comprises glass.

7. The device according to claim 1, wherein both the recesses and the plurality of trapping electrodes are arranged according to a bidimensional pattern in a plane substantially parallel to an average plane of the dielectric layer.

8. The device according to claim 7, wherein the recesses comprise distinct subsets of recesses, and wherein the plurality of trapping electrodes comprise distinct subsets of trapping electrodes arranged to face the distinct subsets of recesses.

9. The device according to claim 1, wherein a minimal distance between the insulating lid and the exposed surface of the dielectric layer is between 10 nm and 200 nm, and wherein the minimal distance is measured substantially perpendicularly to an average plane of the dielectric layer.

10. The device according to claim 1, wherein an average depth of the recesses is between 10 nm and 200 nm, wherein the average depth is measured substantially perpendicularly to an average plane of the dielectric layer, wherein an average radius of the recesses is between 100 nm and 500 nm, and wherein the average radius is measured substantially parallel to an average plane of the dielectric layer.

11. The device according to claim 1, wherein an average thickness of the dielectric layer is between 10 nm and 10 μm, and wherein the average thickness is measured substantially perpendicularly to an average plane of the dielectric layer.

12. A nanoparticle trapping system, comprising:
- a nanoparticle trapping device, comprising:
  - a dielectric layer comprising recesses in an exposed surface of the dielectric layer that are dimensioned to trap nanoparticles;
  - an electrically insulating lid above the exposed surface defining a flow path between the lid and the exposed surface;
  - a plurality of trapping electrodes arranged in a region under the dielectric layer, each trapping electrode aligned with and beneath a respective one of the recesses;
  - a pair of counter electrodes attached to the electrically insulating lid arranged on a peripheral region of the flow path outside the region, wherein, when viewed from a z-direction orthogonal to a plane of the region, the pair of counter electrodes are located outside of the region of the trapping electrodes; and
  - electrical circuit connectors connecting each of the plurality of trapping electrodes to an individually addressable voltage bias; and
- a control unit connected to the electrical circuit connectors and to the pair of counter electrodes, wherein the control unit is configured to apply the voltage biases to selected pairs of i) one of the plurality of trapping electrodes and ii) one of the pair of counter electrodes.

* * * * *